(12) United States Patent
Tesi et al.

(10) Patent No.: US 7,029,171 B2
(45) Date of Patent: Apr. 18, 2006

(54) INTEGRATED DIGITAL TEMPERATURE SENSOR

(75) Inventors: Davide Tesi, Ferney-Voltaire (FR); Ugo Zampieri, Saint Genis Poully (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/682,620

(22) Filed: Oct. 9, 2003

(65) Prior Publication Data

US 2004/0071183 A1 Apr. 15, 2004

(30) Foreign Application Priority Data

Oct. 9, 2002 (FR) .................................. 02 12552

(51) Int. Cl.
 *G01K 15/00* (2006.01)
 *G01K 7/01* (2006.01)
 *G01K 7/14* (2006.01)

(52) U.S. Cl. ........................... 374/1; 374/178; 702/130; 702/99; 327/513

(58) Field of Classification Search ..................... 374/1, 374/170, 173, 178; 327/512, 513; 702/99, 702/130, 133, 131
See application file for complete search history.

(56) References Cited

U.S. PATENT DOCUMENTS

| | | | | |
|---|---|---|---|---|
| 3,921,453 A | * | 11/1975 | Platzer, Jr. ................... | 374/181 |
| 4,165,642 A | * | 8/1979 | Lipp ........................... | 374/170 |
| 4,227,185 A | * | 10/1980 | Kronlage ..................... | 341/167 |
| 4,313,083 A | * | 1/1982 | Gilbert et al. ............... | 323/350 |
| 4,475,103 A | * | 10/1984 | Brokaw et al. .............. | 340/501 |
| 4,562,554 A | * | 12/1985 | Stixrud et al. ................ | 712/36 |
| 4,583,009 A | * | 4/1986 | Eng, Jr. ........................ | 327/540 |
| 5,153,500 A | | 10/1992 | Yamamoto et al. | |
| 5,304,861 A | | 4/1994 | Fruhauf et al. | |
| 5,357,149 A | * | 10/1994 | Kimura ........................ | 327/512 |
| 5,471,131 A | | 11/1995 | King et al. | |
| 5,485,127 A | | 1/1996 | Bertoluzzi et al. | |
| 5,629,611 A | | 5/1997 | McIntyre | |
| 5,646,518 A | | 7/1997 | Lakshmikumar et al. | |
| 5,822,225 A | * | 10/1998 | Quaderer et al. ............. | 702/89 |
| 5,900,773 A | | 5/1999 | Susak | |
| 5,961,215 A | * | 10/1999 | Lee et al. .................... | 374/178 |
| 5,982,221 A | * | 11/1999 | Tuthill ......................... | 327/512 |
| 6,008,685 A | * | 12/1999 | Kunst .......................... | 327/512 |
| 6,255,891 B1 | | 7/2001 | Matsuno et al. | |

(Continued)

OTHER PUBLICATIONS

French Search Report from French Patent Application No. 02/12552, filed Oct. 9, 2002.

(Continued)

*Primary Examiner*—Gail Verbitsky
(74) *Attorney, Agent, or Firm*—Lisa K. Jorgenson; James H. Morris; Wolf, Greenfield & Sacks, P.C.

(57) ABSTRACT

A digital integrated circuit temperature sensor including an analog-to-digital converter providing a binary word representative of a temperature internal to the integrated circuit, and a circuit for providing an analog voltage representative of the circuit temperature and for generating a reference voltage for the analog-to-digital converter. The present invention especially applies to the testing of integrated circuits and to the control of their frequency and/or of their operating temperature according to their internal temperature.

5 Claims, 3 Drawing Sheets

U.S. PATENT DOCUMENTS

| | | | |
|---|---|---|---|
| 6,377,110 B1 | 4/2002 | Cooper | |
| 6,489,831 B1 | 12/2002 | Matranga et al. | |
| 6,531,911 B1 * | 3/2003 | Hsu et al. | 327/512 |
| 6,567,761 B1 * | 5/2003 | Modesto et al. | 702/82 |
| 6,651,020 B1 * | 11/2003 | More | 702/99 |
| 6,679,628 B1 * | 1/2004 | Breinlinger | 374/178 |
| 6,736,540 B1 * | 5/2004 | Sheehan et al. | 374/183 |
| 6,811,309 B1 * | 11/2004 | Ravishanker | 374/178 |
| 6,876,250 B1 * | 4/2005 | Hsu et al. | 327/539 |
| 6,893,154 B1 * | 5/2005 | Gold et al. | 374/170 |
| 6,933,769 B1 * | 8/2005 | Koelling | 327/538 |
| 6,934,645 B1 * | 8/2005 | Kim | 702/64 |
| 2002/0022941 A1 | 2/2002 | Yin | |
| 2004/0075487 A1 * | 4/2004 | Tesi | 327/513 |

OTHER PUBLICATIONS

Weng M-C et al.: "Low Cost CMOS On-Chip And Remote Temperature Sensors" IEICE Transactions On Electronics, Institute of Electronics Information And Comm. Eng. Tokyo, JP vol. E84-C, No. 4, Apr. 1, 2001, pp. 451-459, XP001005886; ISSN: 0916-8524.

Riedijk F. R. et al.: "An Integrated Absolute Temperature Sensor With Sigma-Delta A-D Conversion" Sensors And Actuators A, Elsevier Sequoia S.A., Lausanne, CH, vol. A34, No. 3, Sep. 1, 1992, pp. 249-256, XP000319955; ISSN: 0924-4247.

* cited by examiner

INTEGRATED DIGITAL TEMPERATURE SENSOR

BACKGROUND OF THE INVENTION

1. Field of the Invention

The present invention generally relates to temperature sensors. More specifically, the present invention relates to a digital sensor of the internal temperature of an integrated circuit.

2. Discussion of the Related Art

An example of application of the present invention relates to the temperature characterization of integrated circuits, that is, the verification of the temperatures at which the circuit operates properly. In the final test phases of an integrated circuit, to verify or determine this correct operating temperature range, the circuit is submitted to a specific testing. This testing consists of locally creating an atmosphere heated or cooled down to the desired temperature corresponding to a test temperature. This atmosphere is projected by a pulsed air pipe as close as possible to an integrated circuit to be tested, placed on a support and put in electric relation with a test tool. Once the atmosphere at the desired temperature has been created, the operation of the integrated circuit is tested by means of an external tool. The test is repeated for different temperatures to, for example, verify the proper operation of the circuit in the provided range.

A problem which is posed in this type of application is to know the real temperature of the integrated circuit and, more specifically, temperatures of its semiconductor junctions. On the one hand, the integrated circuit is generally placed in a package which partially protects it from external temperature variations. On the other hand, in operation, the different circuit parts heat up differently, which may alter measurements.

Conventionally, an integrated sensor is used with the circuit to determine a voltage having a known variation according to temperature. Such a sensor is essentially formed of a bipolar transistor integrated in a same semiconductor wafer as the integrated circuit to be tested. The base-emitter voltage of the transistor, having a variation depending on temperature T of the semiconductor substrate, typically silicon, in which this base-emitter junction is integrated, is then measured. The current variation in the junction is imposed by the external test tool on the transistor's emitter. The variation of temperature T according to voltage can be deduced from the following formula:

$$I = I_{sat} \cdot \exp\left(\frac{q \cdot V_{BE}}{n \cdot k \cdot T}\right),$$

where

I is the current imposed by the external source on the emitter of the measurement transistor, $I_{sat}$ is the saturation current of the base-emitter junction of this transistor, q is the elementary charge of the electron, k is Bolzmann's constant, and n is the ideality factor of the transistor.

The disadvantage of conventional test cells is that it is necessary to know the characteristics of the transistor forming the sensor and especially its saturation current and its ideality factor. In practice, a range of ideality factors has to be set, for which the current I imposed to the transistor provides a result which is assumed to be valid.

Another disadvantage of conventional structures is that it is necessary to provide two terminals of access to the measurement transistor from the outside of the circuit. These terminals, which are only used for the testing, are useless afterwards and are prejudicial in terms of bulk.

SUMMARY OF THE INVENTION

The present invention more generally applies as soon as information linked to the internal temperature of the integrated circuit is desired to be exploited.

The present invention aims at providing a digital sensor of the temperature of an integrated circuit.

The present invention also aims at providing such a sensor which has a reduced error margin with respect to known temperature sensors.

The present invention also aims at providing a sensor which is reliable whatever the ideality factor of the transistors of the circuit forming it.

The present invention also aims at providing a sensor which is compatible with a test process, without requiring any additional input/output terminal with respect to the input/output terminals conventionally available on an integrated circuit executing digital functions.

To achieve these and other objects, the present invention provides a digital integrated circuit temperature sensor comprising:

an analog-to-digital converter providing a binary word representative of a temperature internal to the integrated circuit; and a circuit for providing an analog voltage representative of the circuit temperature and for generating a reference voltage for the analog-to-digital converter.

According to an embodiment of the present invention, said provision circuit comprises, in parallel between first, second, third, and fourth terminals of a current mirror, all providing an identical current from a high supply rail and copying the voltage of the first terminal on the second one, and a low supply rail, respectively:

a first diode-connected PNP-type bipolar transistor;

a first resistive element in series with a second diode-connected PNP-type bipolar transistor, the second bipolar transistor being of greater size than the first one;

a second resistive element in series with a third diode-connected PNP-type bipolar transistor, the third bipolar transistor being of a size identical to the first one and said third terminal providing the reference voltage; and a current-to-voltage conversion element, said fourth terminal providing the analog voltage representative of temperature.

According to an embodiment of the present invention, the sensor comprises a voltage mirror formed of two N-channel MOS transistors, copying the voltage between said first and second terminals.

According to an embodiment of the present invention, said conversion element is a resistor.

According to an embodiment of the present invention, the sensor further comprises a circuit for calibrating the analog-to-digital converter capable of providing respective high and low voltages determining the converter's conversion range, the low voltage corresponding to said reference voltage.

According to an embodiment of the present invention, the calibration circuit comprises a first operational amplifier having a non-inverting input receiving said reference voltage and having its output providing said high conversion threshold, the non-inverting input of the first amplifier being connected to the junction point of two variable resistive elements between the output terminal of the first amplifier and the reference voltage; and a second operational amplifier having an inverting input terminal receiving the analog voltage depending on temperature and having a non-inverting input connected to the midpoint of its two resistive elements series-connected between the output terminal of said second operational amplifier and the reference voltage, the second operational amplifier providing an amplified voltage to be converted by said analog-to-digital converter.

According to an embodiment of the present invention, said variable resistive elements are formed of networks of switchable resistors.

The present invention also provides an integrated circuit comprising a digital temperature sensor and a JTAG port of communication with the outside of the circuit, an input/output register of the integrated circuit being connected to a register for memorizing the result provided by the analog-to-digital converter.

The present invention also provides an integrated circuit comprising a digital temperature sensor and a logic block of interpretation of the current temperature measured by the sensor to control the frequency and/or the supply voltage of the is integrated circuit.

The present invention also provides a method for controlling the clock frequency of a digital integrated circuit, consisting of varying the clock frequency in a way inversely proportional to the internal temperature of the circuit.

The present invention further provides a method for controlling the supply voltage of a digital integrated circuit, consisting of varying the supply voltage in a way inversely proportional to the internal circuit temperature.

According to an embodiment of the present invention, the temperature is measured by means of an integrated sensor.

The foregoing objects, features, and advantages of the present invention will be discussed in detail in the following non-limiting description of specific embodiments in connection with the accompanying drawings.

DETAILED DESCRIPTION

Figure 1:
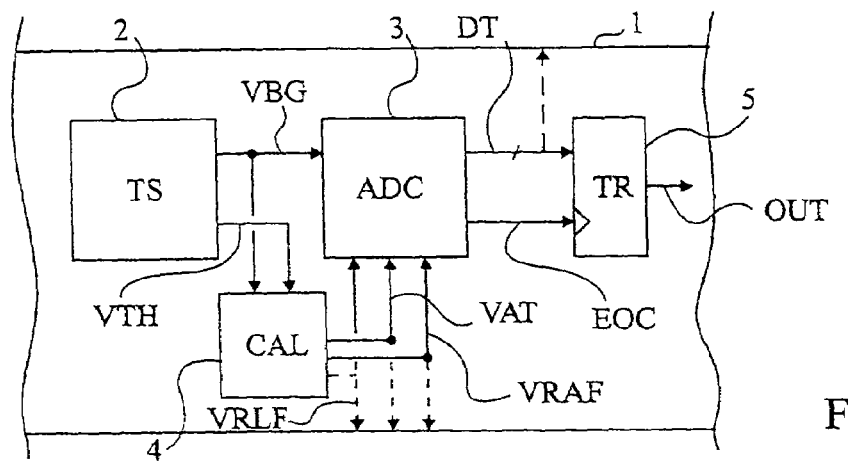
FIG. 1 partially shows in the form of blocks an embodiment of a digital thermal sensor according to the present invention.

Same elements have been designated with same reference numerals in the different drawings. For clarity, only those elements that are necessary to the understanding of the present invention have been shown in the drawings and will be described hereafter. In particular, the other components of the circuit on which the sensor of the present invention is integrated have not been detailed and are no object of the present invention. The present invention applies whatever the integrated circuit type and the functions that it integrates.

FIG. 1 partially shows in the form of blocks an embodiment of a digital thermal sensor, integrated in a circuit 1 according to the present invention.

This thermal sensor essentially comprises a circuit 2 (TS) forming a sensor of an analog voltage $V_{TH}$ varying along with the integrated circuit temperature, an analog-to-digital converter 3 (ADC) for transforming an analog voltage varying along with temperature into a digital word DT representative of the measured temperature, and a circuit 4 (CAL) for calibrating converter 3.

Figure 2:
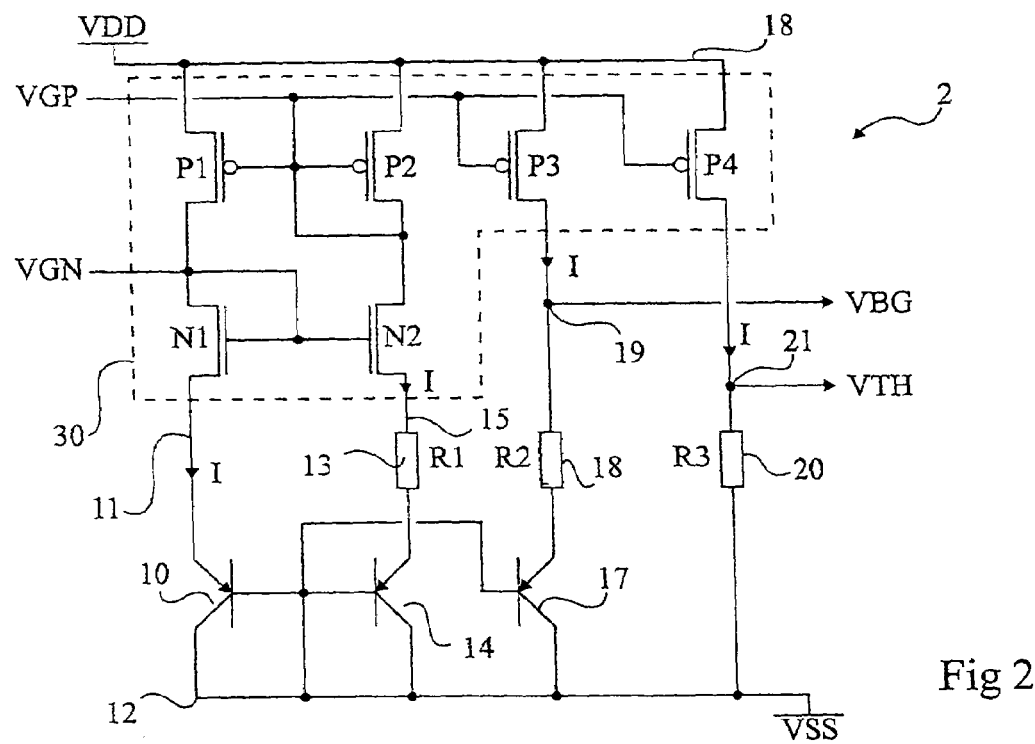
FIG. 2 shows the electric diagram of a sensor of a voltage varying along with temperature according to an embodiment of the present invention.

According to the present invention and as will be seen hereafter in more specific relation with FIG. 2, measurement circuit 2 provides not only a voltage $V_{TH}$ indicative of temperature but also a reference voltage $V_{BG}$ for the analog-to-digital conversion. Voltage $V_{BG}$ is, for example, provided to calibration circuit 4 as well as to converter 3.

The function of calibration circuit 4 is to amplify signal $V_{TH}$ into an analog signal $V_{AT}$ acceptable at the input of converter 3 and to set two thresholds $V_{RLF}$ and $V_{RHF}$ defining the conversion range of the converter, that is, an analog voltage $V_{RLF}$ for which converter 3 provides a signal DT only comprised of bits at zero and an analog voltage $V_{RHF}$ for which converter 3 only provides bits at one. Low threshold $V_{RLF}$ of converter 3 preferentially corresponds to reference voltage $V_{BG}$. This is why, in the representation of FIG. 1, said voltage is directly transmitted from circuit 2 to converter 3.

Converter 3 is an analog-to-digital converter of conventional structure. In particular, it preferably provides a signal EOC indicative of the end of a conversion after reception of a signal $V_{AT}$ to be converted, generally under control of a start-of-conversion signal SOC (not shown).

In the preferred embodiment of FIG. 1, signal EOC is connected to a clock input of a register 5 (TR) for storing temperature DT provided by converter 3 at each conversion. Output OUT of register 5 is then exploited according to the desired application.

As illustrated by the dotted lines in FIG. 1, current temperature DT may, if desired, be directly provided on an input/output port of circuit 1. Similarly, voltages $V_{RLF}$ and $V_{RHF}$ representative of the converter's operating range as well as analog voltage $V_{AT}$ to be converted may be provided on external access terminals of integrated circuit 1.

FIG. 2 shows the electric diagram of a preferred embodiment of analog sensor 2 of FIG. 1. In FIG. 2, the sensor is only partially shown. In particular, an activation circuit thereof will be described subsequently in relation with FIG. 4.

According to the present invention, the circuit of FIG. 2 forms both an element of detection of the internal temperature of the integrated circuit and a circuit for generating reference voltage $V_{BG}$ of bandgap type used by calibration circuit 4 of the converter.

The circuit of FIG. 2 comprises a first branch comprising a PNP-type bipolar transistor 10, diode-connected between two terminals 11 and 12 of the sensor. A terminal 11 is connected to the emitter of transistor 10 while its base and its collector are interconnected to a terminal 12 intended to be connected to a rail of low voltage reference supply $V_{SS}$ of the integrated circuit (generally the ground).

A second branch comprises a resistive element 13, for example, a resistor of value R1, and a diode-connected PNP-type bipolar transistor 14, in series between a terminal 15 and terminal 12. Resistive element 13 is interposed between terminal 15 and the emitter of transistor 14, having its base and its collector interconnected to terminal 12.

A third branch of provision of reference voltage $V_{BG}$ comprises a PNP-type bipolar transistor 17 in series with a resistor 18 of value R2 between an output terminal 19 of the sensor providing voltage $V_{BG}$ and terminal 12. The emitter of transistor 17 is connected to a first terminal of resistor 18 having its second terminal connected to terminal 19 while the collector of transistor 17 is connected to terminal 12. The base of transistor 17 is connected to the bases of transistors 10 and 14 so that it is also diode-connected.

A fourth branch for providing voltage $V_{TH}$ comprises a current-to-voltage converter 20, between an output terminal 21 of the sensor providing voltage $V_{TH}$ and terminal 12. For example, current-to-voltage converter 20 is a resistor of value R3.

According to the present invention, transistors 10 and 14 are of different sizes, transistor 14 being larger than transistor 10, and transistors 17 and 10 preferably have identical sizes.

A circuit 30 is used, on the one hand, to copy the voltage of terminal 11 on terminal 15 and, on the other hand, as a current mirror between the four branches. Circuit 30 is interposed between a rail 18 of high supply $V_{DD}$ and terminals 11, 15, 19, 21.

Circuit 30 is, for example, formed of a so-called Wilson mirror. Such a mirror comprises the parallel connection of four P-channel MOS transistors P1, P2, P3, and P4 (one for each branch), having their respective sources connected to supply $V_{DD}$, transistor P2 having its gate and its drain interconnected. The respective drains of transistors P1 and P2 of the first two branches of the sensor are connected to the respective drains of two N-channel MOS transistors, respectively N1 and N2, used to copy the voltage of terminal 11 on terminal 15, transistor N1 having its gate and its drain interconnected. The respective sources of transistors N1 and N2 are connected to terminals 11 and 15. On the side of the third and fourth branches, the respective drains of transistors P3 and P4 are directly connected to terminals 19 and 21, and thus to respective resistors 18 and 20.

The gates of transistors P1 to P4 are interconnected and are intended to receive a control signal $V_{GP}$. The respective gates of transistors N1 and N2 are interconnected and are intended to receive a control signal $V_{GN}$. The generation of signals $V_{GP}$ and $V_{GN}$ of activation of the sensor of FIG. 2 is, preferably, performed when necessary by means of a specific activation circuit, a preferred embodiment of which will be described hereafter in relation with FIG. 4. The function of such an activation circuit is to limit the sensor consumption.

The operation of circuit 2 of FIG. 2 is the following.

Current I imposed by source 30 in the first sensor branch may be expressed as follows:

$$I = I_{sat10} \cdot \exp\left(\frac{q \cdot V_{BE10}}{n_{10} \cdot k \cdot T}\right),$$

where $I_{sat10}$, $V_{BE10}$, and $n_{10}$ respectively designate the saturation current, the base-emitter voltage and the ideality factor of transistor 10.

In the second branch of the sensor, current I fulfils the two following relations:
$V_{13} = R1 \cdot I$, where $V_{13}$ designates the voltage drop across resistor 13; and $$I = I_{sat14} \cdot \exp\left(\frac{q \cdot V_{BE14}}{n_{14} \cdot k \cdot T}\right),$$

where $I_{sat14}$, $V_{BE14}$, and $n_{14}$ respectively designate the saturation current, the base-emitter voltage and the ideality factor of transistor 14.

Designating as A the size ratio between transistors 10 and 14, such that $I_{sat14} = A \cdot I_{sat10}$, one may write:

$$A = \exp\left(\frac{q}{k \cdot T} \cdot \left(\frac{V_{BE10}}{n_{10}} - \frac{V_{BE14}}{n_{14}}\right)\right).$$

Since transistors 10 and 14 are formed simultaneously and are of the same type, it can be considered that $n_{10} = n_{14} = n$. On then obtains:

$$V_{BE10} - V_{BE14} = \frac{n \cdot k \cdot T}{q} \cdot \ln(A).$$

On the other hand, voltage $V_{13}$ is equal to the voltage difference between the base-emitter junction of transistor 14 and the voltage at point 15. Due to the copying by element 30 of the voltage of terminal 11 on terminal 15, one may write:

$V_{13} = V_{BE10} - V_{BE14}$.

Finally, in the fourth branch of the sensor, current I fulfils law $V_{TH} = R3 \cdot I$, $V_{TH}$ corresponding to the voltage drop across resistor 20.

One may thus write:

$$I = \frac{V_{13}}{R1} = \frac{V_{TH}}{R3}, \text{ where } V_{13} = \frac{n \cdot k \cdot T}{q} \cdot \ln(A).$$

Replacing $V_{13}$ with its expression according to temperature T, one obtains:

$$T = \frac{q}{n \cdot k \cdot \ln(A)} \cdot \frac{R1 \cdot V_{TH}}{R3}.$$

To determine the value of temperature T, it is then sufficient to determine the only unknown of the above equation, that is, voltage $V_{TH}$ across resistor 20 directly proportional to temperature variations. Due to the integration of circuit 2 in a same integrated circuit, the sensor operation is independent from current I.

According to the present invention, the interpretation of voltage $V_{TH}$ is performed by means of converter 3 and of its calibration circuit 4, the latter being calibrated, for example, in a test phase, as will be described hereafter.

The third branch (resistor 18 and transistor 17) of circuit 2 is used to generate reference voltage $V_{BG}$ of the analog-to-digital conversion. Voltage $V_{BG}$ must be stable against possible temperature and supply voltage variations and against possible technological dispersions.

In the third branch, one may write:

$V_{BG} = R2 + V_{BE17}$, where $V_{BE17}$ represents the base-emitter voltage of transistor 17.

Voltage $V_{BG}$ can thus be expressed according to voltage $V_{TH}$ as follows:

$$V_{BG} = \frac{R2}{R3} \cdot V_{TH} + V_{BE17}.$$

From the above relation, it can be seen that the temperature drifts of the two added voltage terms compensate for each other. Indeed, voltage $V_{TH}$ has a drift directly proportional to temperature with a positive coefficient, that is, it increases along with temperature. Conversely, voltage $V_{BE17}$, a base-emitter voltage of a PNP transistor, has a negative temperature coefficient, that is, it decreases as the temperature increases. Accordingly, voltage $V_{BG}$ is effectively stable in temperature.

Since all the transistors constitutive of the circuit of FIG. 2 are formed simultaneously and are of the same type, it can be considered that they undergo the same possible drifts linked to technological dispersions.

As for the supply voltage stability, it is ensured by current mirror circuit 30.

Figure 3:
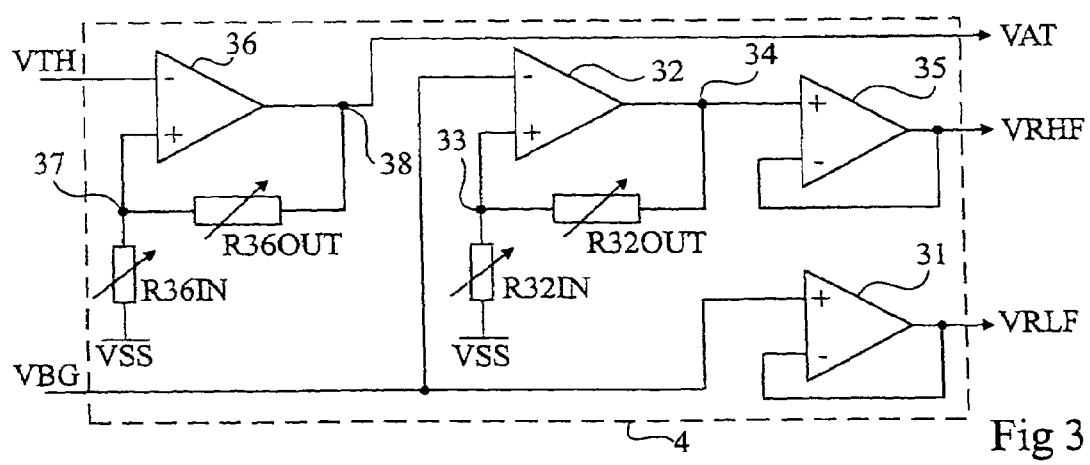
FIG. 3 shows a first embodiment of circuit for calibrating a sensor according to the present invention.

Voltages $V_{TH}$ and $V_{BG}$ provided by circuit 2 are exploited by calibration circuit 4, an embodiment of which is illustrated in FIG. 3.

Circuit 4 forms, in a way, an analog interface for the inputs of converter 3 so that the low-impedance input of the converter does not affect the measured voltage which must remain temperature-dependent. Circuit 4 also has the function of amplifying if need be the measured level $V_{TH}$ according to the converter resolution and of generating reference levels $V_{RHF}$ and $V_{RLF}$ corresponding to the respectively maximum and minimum voltage levels of the conversion scale of converter 3. These levels correspond to the respectively maximum and minimum possible levels of analog voltage $V_{AT}$ provided to the converter, that is, $B \cdot V_{TH}$, where B represent the amplification performed on the voltage measured by circuit 2.

In the embodiment of FIG. 3, it is assumed that level $V_{BG}$ directly forms low conversion threshold $V_{RLF}$ of converter 3. Circuit 4 then only adapts the impedance of voltage level $V_{BG}$, by means of a follower-connected operational amplifier 31 (its inverting input being looped back on its output) which provides level $V_{RLF}$ and the non-inverting input of which receives voltage $V_{BG}$ of circuit 2.

Threshold $V_{RHF}$ is set, based on voltage $V_{BG}$, by means of an operational amplifier 32 having an inverting input receiving level $V_{BG}$ and having a non-inverting input connected to midpoint 33 of a resistive dividing bridge formed of two resistors R32OUT and R32IN in series between output 34 of amplifier 32 and reference supply voltage $V_{SS}$. Resistors R32IN and R32OUT are adjustable to set the amplification ratio of amplifier 32 and, accordingly, the maximum high conversion level $V_{RHF}$, in stable fashion with respect to voltage $V_{BG}$. For impedance matching needs, output 34 of amplifier 32 is connected to the input of a follower-connected operational amplifier 35 which provides threshold $V_{RHF}$ to converter 3, the inverting input of amplifier 35 being connected to its output while its non-inverting input is connected to terminal 34.

As for voltage $V_{AT}$, it is calibrated by means of an operational amplifier 36 having its inverting input receiving the analog level $V_{TH}$ measured by circuit 2 and having its non-inverting input connected to the midpoint 37 of a resistive dividing bridge formed by the series association of resistors R36OUT and R36IN between output terminal 38 of amplifier 36 and reference voltage $V_{SS}$. Terminal 38 forms the output terminal of circuit 4 providing voltage $V_{AT}$ to be converted by converter 3. Resistors R36IN and R36OUT set amplification ratio B.

The calibration of the system by means of circuit 4 of FIG. 3 consists of submitting the circuit to a temperature corresponding to the minimum threshold (for example, −40° C.) by means of an external cold source. Resistors R36IN and R36OUT are then adjusted for level $V_{TH}$ provided by circuit 4 to correspond to level $V_{BG}$ (that is, level $V_{RLF}$). This adjustment may be performed either by comparing analog voltages $V_{TH}$ and $V_{RLF}$, or by reading the output of converter 4, all the bits of which must be at 0 when voltage $V_{TH}$ corresponds to the minimum level of the conversion scale.

The integrated circuit is then submitted to a temperature corresponding to the maximum temperature of the conversion range (for example, +125° C.), still by means of an external source. Resistances R32IN and R32OUT are then adjusted until voltage $V_{RHF}$ is equal to the measured voltage $V_{TH}$. Like for the preceding step, either analog levels $V_{TH}$ and $V_{RHF}$ may be compared, or the output of converter 3 may be examined, all its bits then having to be at state 1.

For each of amplifiers 32 and 36, if the output level is too high with respect to the desired level, either the input resistance (R32IN, respectively R36IN) may be increased, or the response resistance (R32OUT, respectively R36OUT) may be decreased. If the output level is too low, the inverse operation is performed, that is, the input resistance is decreased or the response resistance is decreased.

The analog-to-digital converter used may be any conventional converter providing an output over a number of bits selected according to the resolution desired for the sensor. If need be, the converter inputs/outputs are associated with level-shifting circuits (not shown) for the case where the respective supply voltages of sensor 2 and of converter 3 are not compatible with each other.

Figure 4:
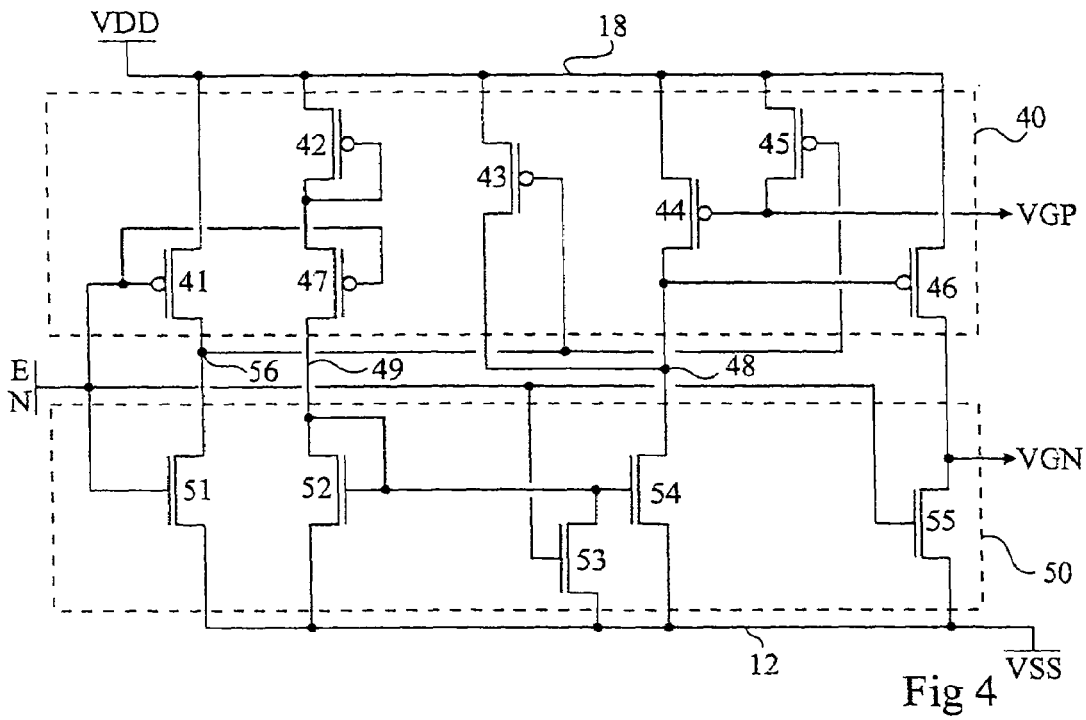
FIG. 4 shows an embodiment of a circuit for activating the voltage sensor of FIG. 2.

FIG. 4 shows an embodiment of a circuit for activating the heat detector of FIG. 2, that is, a circuit capable of generating voltages $V_{GP}$ and $V_{GN}$ as a response to an activation signal EN. This circuit comprises a first stage 40 of P-channel MOS transistors and a second stage 50 of N-channel MOS transistors between high and low supply rails 18 and 12, respectively. The two stages 40 and 50 receive a same control signal EN and each respectively provide voltage $V_{GP}$ or $V_{GN}$ of activation of the transistors of the circuit of FIG. 1.

Stage 40 comprises six P-channel MOS transistors 41 to 46 having their source and their bulk connected to high supply $V_{DD}$. The gate of transistor 44 and the drain of transistor 45 form the output terminal providing signal $V_{GP}$. The drain of transistor 41 is connected to the gate of transistors 43 and 45. The gate of transistor 41 is connected to the gate of a seventh P-channel MOS transistor 47 series-connected with transistor 42, its source being connected to the drain and to the gate of diode-connected transistor 42. The respective gates of transistors 41 and 47 receive signal EN. The drains of transistors 43 and 44 are interconnected to the gate of transistor 46 and form a terminal 48 of connection to second stage 50. The bulk of transistor 47 is connected to high supply $V_{DD}$. Its drain forms a second terminal 49 of connection to the second stage while the drain of transistor 41 forms a third terminal 56 of connection to the second stage.

Stage 50 of the N-channel transistors comprises five MOS transistors 51 to 55 having all their sources connected to reference supply rail $V_{SS}$. The gates of transistors 51, 52, and 55 are connected to the input terminal providing signal EN. The drain of transistor 51 is connected to the drain of transistor 41 (terminal 56). The gates of transistors 52 and 54 are interconnected to the drains of transistors 53 and 52 (and thus to terminal 49). The drain of transistor 54 is connected to terminal 48 while the drain of transistor 55 is connected to the drain of transistor 46 of stage 40 and forms the terminal of provision of output voltage $V_{GN}$.

In the idle state, when the transistors of the temperature sensor need not be biased, signal EN is high (for example, at voltage $V_{DD}$). In this state, transistors 43, 45, 51, 53, and 55 of the circuit of FIG. 4 are on, transistors 41, 42, 44, 46, 47, 52, and 54 being off. As a result, signal $V_{GN}$ is low (voltage $V_{SS}$) while signal $V_{GP}$ is high. Accordingly, the transistors of the current mirror of FIG. 2 are off.

Upon activation of the circuit by a low setting (to a voltage close to $V_{SS}$) of input EN, transistors 41, 42, 44, 46, 47, 52, and 54 turn on, while transistors 43, 45, 51, 53, and 55 turn off. In fact, the voltage at initially-discharged node D42 (drain of transistor 42) starts increasing. The same occurs for the voltage at node 49 since no further current flows through the branch formed by transistors 42, 47, and 52. The turning-on of transistor 54 turns on transistor 46. A current starts flowing from rail 18 to the drain and base of transistor N1 (FIG. 2). This turns on the mirror-connected transistors of FIG. 2 and a current I then flows through all the sensor branches. In steady state, the current flowing through the branch formed of transistors 42, 47, and 52 is identical to the current in the branch formed of transistors 44 and 54 by the mirror assembling of transistors 52 and 54. This current is much smaller than current I. The transistors of the assembly of FIG. 4 are sized so that, in this steady state, the voltage at node 48 is greater than the threshold voltage of transistor 46 to stop the flowing of the starting current to the sensor, which would otherwise adversely affect the operation of its current mirror.

An advantage of the digital thermal sensor of the present invention is that it provides a binary word DT representative of the internal temperature of the integrated circuit. As compared to external sensors formed, for example, of thermistors or the like, the present invention has the advantage of providing an accurate temperature, exactly corresponding to the temperature of the silicon substrate in which the different circuits are integrated.

Another advantage of the present invention is that by allowing integration of all the temperature sensor components, and of the digital conversion of this temperature in a same integrated circuit chip, problems linked to technological dispersions or to differences in bipolar transistor ideality factors are avoided.

Figure 5:
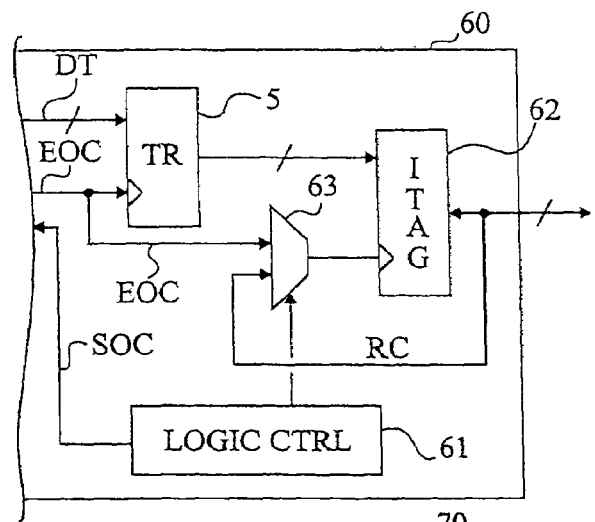
FIG. 5 partially illustrates in the form of blocks a first example of application of the present invention to the testing of an integrated circuit.

FIG. 5 very schematically and partially illustrates a first example of application of the present invention. The shown circuit 60 exploits digital signal DT provided by the sensor of FIG. 1, more specifically based on the content of register 5.

In the example of FIG. 5, the case where the heat detector is used to test the integrated circuit comprising it and, especially, to determine the proper operating temperature range of the circuit, is considered.

According to this example of application, the integrated circuit is first submitted to an external heat source. Then, a heat detection is started by means of a logic control circuit 61 (LOGIC CTRL). This circuit provides analog-to-digital converter 3 (not shown in FIG. 5) with a start-of-conversion signal SOC. A corresponding input is generally present in an analog-to-digital converter. Signal SOC may also correspond to signal EN of activation of the circuit of FIG. 4 to start a heat detection. A clock signal not shown is also required for the converter operation. This clock signal is, for example, combined with signal SOC to be transmitted to the converter only to order of circuit 61.

According to the embodiment of FIG. 5, the output of register 5 is sent to the input of a JTAG register 62 connected to a JTAG-type input/output port of circuit 60. The clock input of register 62 is controlled by a multiplexer 63 having its two respective inputs receiving clock input signal EOC of register 5 and a signal RC originating from the JTAG port (and thus from the outside of circuit 60) and corresponding to a read clock. The multiplexer is controlled by block 61 to appropriately start the writing into and the reading from register 62. Circuit 61 starts a measurement of the temperature, followed by its storage in register 62, by selecting input EOC of multiplexer 63. When an external temperature interpretation tool requires it by read signal RC, JTAG register 62 is read from to provide the measured temperature to the outside. If necessary, several successive temperatures may be stored in registers 5 and 62.

An advantage of exploiting a JTAG register of an integrated circuit is that such a register is present in most integrated circuits executing digital functions. Further, JTAG ports are bi-directional ports which are generally used to configure the circuit. The present invention then takes advantage of this bidirectional port to extract information about the temperature, without it being necessary to provide a specific terminal on the integrated circuit.

The practical implementation of the application mode of FIG. 5 is within the abilities of those skilled in the art based on the functional indications given hereabove.

Figure 6:
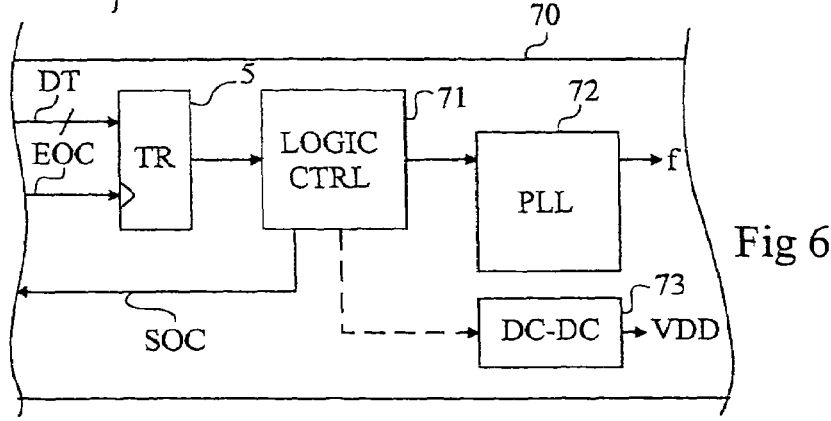
FIG. 6 partially illustrates in the forms of blocks a second example of application of the present invention to the control of an operating frequency and/or of a supply voltage of an integrated circuit according to its internal temperature.

FIG. 6 illustrates, in a very simplified partial view of an integrated circuit 70, a second example of application of the present invention. Here again, this circuit exploits the signals provided by the circuit of FIG. 1.

The circuit of FIG. 6 corresponds to a new application permitted by the present invention, that is, a control of frequency f and/or of supply voltage $V_{DD}$ of integrated circuit 70 according to its internal operating temperature, measured by the circuit of FIG. 1. A logic block 71 (LOGIC CTRL) controls, for example, a phase-locked loop 72 (PLL) providing clock frequency f of the circuit, and possibly a converter 73 (DC-DC) providing voltage $V_{DD}$. For example, circuit 71 periodically triggers a temperature measurement via signal SOC, and the temperature measurements are exploited to modify, if need be, frequency f and/or voltage $V_{DD}$.

For example, when circuit 70 heats up, the clock frequency may be reduced to enable its accelerated cooling down. Similarly, supply voltage $V_{DD}$ may be varied to decrease its temperature. In this case, conversely to the test embodiment, the instantaneous temperature value is used to optimize the integrated circuit consumption.

The present invention takes advantage from the fact that the elements controlling the frequency and/or the supply voltage are now most often digitally-controlled.

The frequency and/or supply voltage control law is contained in logic block 71 and depends on the application.

Figure 7:
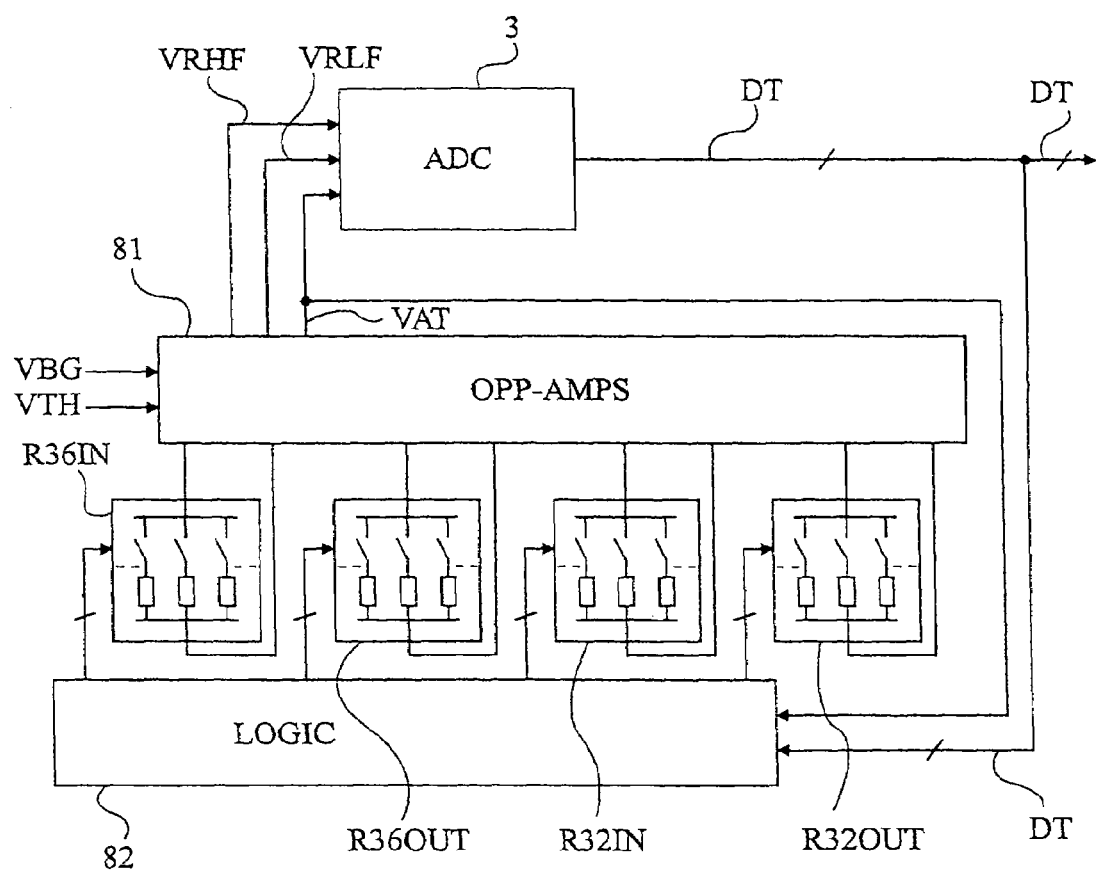
FIG. 7 very schematically shows a second embodiment of a circuit for calibrating the sensor of FIG. 1.

FIG. 7 shows a second embodiment of a circuit for calibrating converter 3 of the heat detector of the present invention. According to this embodiment, the different resistors R36IN, R36OUT, R32IN, and R32OUT of the operational amplifiers (symbolized by block 81 in FIG. 7) are formed of networks of switchable resistors (for example, of parallel associations of series connections of controllable switches with fixed resistors). The switches of the different networks are controlled by a logic circuit 82 (LOGIC) providing, for each of the resistive networks, a number of control signals corresponding to the number of switches.

Circuit 82 has the function of interpreting the logic output DT provided by converter 3 and output level $V_{AT}$ of amplifier network 81 to set the respective values of the associated amplification resistors.

The operation of the circuit of FIG. 7 can be deduced from that discussed in relation with FIG. 3. The forming of logic circuit 82 according to the desired results is within the abilities of those skilled in the art. For example, the networks of switchable resistors are formed of resistors associated with fusible switches. In this case, if voltage $V_{AT}$ is too high with respect to the desired level (be it for the determination of the amplification of level $V_{TH}$ or of threshold $V_{RHF}$), input value R36IN or R32IN is desired to be increased, which amounts, according to the series or parallel arrangement of the switchable resistors, to turning off or on the respective switches. According to another example, the switchable resistors are controllable by switches of MOS transistor type, the respective states of which are found at each circuit power-on. It should be noted that logic circuit 82 preferentially uses a clock signal enabling control of the operation of its different components and especially of flip-flops, counters, and registers, if necessary.

An advantage of the embodiment of FIG. 7 is that it enables automated calibration of the digital temperature sensor, in an initial operating phase.

Of course, the present invention is likely to have various alterations, modifications, and improvements which will readily occur to those skilled in the art. In particular, the practical forming of the integrated circuit is within the abilities of those skilled in the art based on the functional indications given hereabove. Further, the specific structure of circuit 30 described in relation with FIG. 2 has been described as an example only and any other current- and voltage-copying structure stable in temperature and supply voltage may be envisaged.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A digital integrated circuit temperature sensor comprising:

an analog-to-digital converter providing a binary word representative of a temperature internal to the integrated circuit;

a generating circuit for providing an analog voltage representative of the circuit temperature and for generating a reference voltage for the analog-to-digital converter; and a calibration circuit providing respective high and low conversion thresholds to the converter, the low voltage corresponding to said reference voltage, said calibration circuit comprising:

a first operational amplifier having a non-inverting input receiving said reference voltage and having its output providing said high conversion threshold, the non-inverting input of the first amplifier being connected to the junction point of two variable resistive elements series-connected between the output terminal of the first amplifier and a supply reference potential; and a second operational amplifier having an inverting input terminal receiving the analog voltage depending on temperature and having a non-inverting input connected to the midpoint of two resistive elements series-connected between the output terminal of said second operational amplifier and said supply reference potential, the second operational amplifier providing an amplified voltage to be converted by said analog-to-digital converter.

2. The sensor of claim 1, wherein said generating circuit comprises, in parallel between first, second, third, and fourth terminals of a current mirror all providing an identical current from a high supply rail and copying the voltage of the first terminal on the second one, to a low supply rail, respectively:

a first diode-connected PNP-type bipolar transistor;

a first resistive element in series with a second diode-connected PNP-type bipolar transistor, the second bipolar transistor being of greater size than the first one;

a second resistive element in series with a third diode-connected PNP-type bipolar transistor, the third bipolar transistor being of a size identical to the first one and said third terminal providing the reference voltage; and a current-to-voltage conversion element, said fourth terminal providing the analog voltage representative of the temperature.

3. The sensor of claim 2, comprising a voltage mirror formed of two N-channel MOS transistors, copying the voltage between said first and second terminals.

4. The sensor of claim 2, wherein said conversion element is a resistor.

5. The sensor of claim 1, wherein said variable resistive elements are formed of networks of switchable resistors.

* * * * *

UNITED STATES PATENT AND TRADEMARK OFFICE
CERTIFICATE OF CORRECTION

PATENT NO. : 7,029,171 B2 Page 1 of 1
APPLICATION NO. : 10/682620
DATED : April 18, 2006
INVENTOR(S) : Davide Tesi et al.

It is certified that error appears in the above-identified patent and that said Letters Patent is hereby corrected as shown below:

Title page,
Item [75], should read:
-- Inventors: Daivde Tesi, Ferney-Voltaire (FR); Ugo Zampieri, Saint Genis Pouilly (FR) --.

Column 3,
Line 24, should read -- the integrated circuit. --.

Signed and Sealed this

Twenty-seventh Day of June, 2006

JON W. DUDAS
*Director of the United States Patent and Trademark Office*